Patented Oct. 31, 1950

2,527,806

UNITED STATES PATENT OFFICE 2,527,806

DICARBOXYLIC ACID ANHYDRIDE-4-VINYL-CYCLOHEXENE DIEPOXIDE REACTION PRODUCTS

Robert E. Foster, New Castle, Del., assignor to E. I. du Pont de Nemours & Company, Wilmington, Del., a corporation of Delaware No Drawing. Application February 10, 1948, Serial No. 7,522

15 Claims. (Cl. 260—78.4)

This invention relates to polymeric materials and more particularly to high molecular weight polyesters having improved properties and to methods for their preparation.

Resinous polyesters of various types have been prepared by reacting anhydrides of polycarboxylic acids with a variety of alkylene oxides, including certain dioxides. However, the hitherto known methods for preparing polyesters from these particular dioxides have involved the use of two moles of dicarboxylic acid anhydride with one mole of the dioxide, resulting in the formation of polymers which are unsuitable for certain applications. More specifically, the hitherto known polyesters, which have been prepared from the above mentioned proportions of reactants, have been unsatisfactory in one or more of the following properties: transparency, hardness, toughness, water resistance, scratch resistance, infusibility, and insolubility in organic solvents. Polyesters possessing such a combination of properties are highly desirable for use in the manufacture of articles for various ornamental uses.

This invention has as an object a new and improved type of resinous material. Further objects are the production of new thermosetting polyesters and of thermoset products possessing to a high degree the properties of hardness, infusibility, strength, transparency, and water resistance. Further objects reside in methods for obtaining these thermosetting and thermoset products. Other objects will appear hereinafter.

It has now been found that thermosetting, rigid, moldable, solid polyesters can be obtained by heating an anhydride of a dicarboxylic acid with a particular diepoxide, namely, 4-vinylcyclohexene diepoxide, in molar proportions in the range of 0.95 to 1.25 moles of anhydride to 1.0 mole of diepoxide. It has also been found that, on further heating, these products are converted into hard, transparent, water-resistant, infusible resins having an Izod impact strength of at least 0.2 ft. lbs./in. of notch, a hardness of at least 60 on the Rockwell M scale, and which are capable of being machined and polished. They are also scratch resistant and insoluble in common organic solvents.

The process of this invention is, in general, carried out by heating to a temperature of about 75° to 250° C. a mixture of 4-vinylcyclohexene diepoxide and an anhydride of a dicarboxylic acid in molar proportions ranging from 0.95 to 1.25 moles of anhydride to 1.0 mole of diepoxide. The heating is preferably carried out in 2 stages. In the first stage heating is carried out at the lower temperatures within the above limits, e. g., at 75° to 130° C., until a gel is formed. Heating times ranging from 1 to 5 hours are usually sufficient for producing this gel, which is a thermosetting, rigid, moldable, solid polyester. The preferred temperature range for use in this stage of the reaction depends on the particular anhydride being used. The preferred minimum temperature is that at which the particular reaction mixture forms a uniform melt. With aliphatic anhydrides, e. g., maleic anhydride, temperatures of at least 80° C. are preferred, while with the higher melting aromatic anhydrides, e. g., phthalic anhydride, temperatures of at least 110° C. are required. A convenient method is to heat the reaction mixture to the temperature at which the mixture melts and maintain the environment at this point until the reactants form a gel.

In the second stage of this process the thermosetting polymer from the first stage is heated further at temperatures preferably in the higher ranges of the above defined limits, i. e., at 140° C. to 250° C. This second-stage heating can be carried out directly on the gel formed in the first stage, or the gel can be cooled and formed into granular particles or other desired shape and then heated until the polyester becomes a transparent, hard, infusible resin. The conversion of the thermosetting resin to the infusible resin takes place in periods ranging from 5 to 10 minutes up to 2 to 6 hours depending upon whether a catalyst is used and upon the amount of catalyst present, and upon the temperature employed. The preferred temperature for the second-stage heating is from 140° to 170° C., since higher temperatures cause undesirable discoloration of the polymer.

A small amount of water or an acidic or basic material catalyzes this reaction, but it is not essential to add such materials to the reaction mixture. There is usually sufficient moisture in the reactants or in the atmosphere to initiate the opening of the epoxide or anhydride linkages. However, it is usually desirable, in order to increase the rate of reaction, to add from 0.001% to 1% based on the weight of reactants of water, an acid, a base, or a phenol as catalyst. When the thermosetting polyester is prepared for use as a molding powder, it is preferred to omit adding a catalyst in the first stage of the reaction, but to incorporate in the granular powder prepared from the thermosetting gel, a catalyst of one of the above types in order to shorten the heating time required to form an infusible, hard polymer to that commonly employed in molding operations, i. e., periods of 5 to 10 minutes.

The 4-vinylcyclohexene diepoxide used in the process of this invention can be prepared by the addition of a dilute, aqueous, hypochlorous acid solution to 4-vinylcyclohexene at about 0° C., followed by removal of the elements of hydrogen chloride from the addition product by means of aqueous sodium hydroxide at a temperature below 15° C. The preparation of this starting material is described in greater detail in U. S. applications Serial Nos. 743,198 (now abandoned) and 743,199, filed April 22, 1947, by Allenby and Harris.

This invention is further illustrated by the following examples in which proportions of ingredients are expressed in parts by weight unless otherwise stated.

Example I

A mixture of 35 parts of phthalic anhydride and 28 parts of 4-vinylcyclohexene diepoxide (1.17:1.0 mole ratio) containing 0.05 part of 1% aqueous benzyltrimethylammonium hydroxide as catalyst is heated at 130° C. for 2.5 hours. During this heating the solution first becomes a clear melt which subsequently gels. The temperature is then raised to 150° C. and maintained at this point for 4.5 hours. The resulting polymer is brilliant, transparent, amber in color, and very hard, and is readily machined. Test bars fashioned from this polymer exhibit the following standard test data:

Impact strength (Izod), 0.457 ft. lb./in. of notch.
Tensile strength, 5,960 lbs./sq. in.
Elongation, 0.0%.
Rockwell hardness (M scale), 95.
Stiffness in flexure, 454,928 lbs./sq. in.
Water absorption (24 hours immersion at room temperature), 0.2%.
Density, 1.41.
Refractive index, $n_D^{25}$, 1.57.

Example II

A mixture of 37 parts of phthalic anhydride, 28 parts of 4-vinylcyclohexene diepoxide (mole ratio of 1.25:1.0) and 0.05 part of 2% aqueous ammonium hydroxide as catalyst is heated at 125° C. for 2¾ hours, during which time a gel is formed. Heating is continued at 150° C. for 6 hours. The resulting polymer has a brilliant amber color, and is transparent and hard. Test bars fashioned from this polymer are readily machined and polished and exhibit the following test data:

Impact strength (Izod), 0.285 ft. lb./in. of notch.
Tensile strength, 3,984 lbs./sq. in.
Elongation, 0.0%.
Rockwell hardness (M scale), 100.
Stiffness in flexure, 172,712 lbs./sq. in.

Example III

A mixture of 30 parts of phthalic anhydride, 28 parts of 4-vinylcyclohexene diepoxide (1.015:1.0 mole ratio) and 0.05 part of 2% aqueous ammonium hydroxide as catalyst is heated at 125° C. for 2¾ hours, during which time a gel is formed. Heating is continued at 150° C. for 6 hours. The resulting polymer is a hard, transparent, amber colored resin having the following properties:

Impact strength (Izod), 0.242 ft. lb./in. of notch.
Tensile strength, 9,937 lbs./sq. in.
Stiffness in flexure, 354,504 lbs./sq. in.
Rockwell hardness (M scale), 100.

Example IV

A mixture of 28 parts of phthalic anhydride, 28 parts of 4-vinylcyclohexene diepoxide (.095:1.0 mole ratio) and 0.05 part of 1% aqueous benzyltrimethylammonium hydroxide as catalyst is heated at 125° C. for 1⅔ hours, followed by a 5-hour heat treatment at 140° to 150° C. The transparent amber polymer formed possesses the following properties:

Impact strength (Izod), 0.285 ft. lb./in. of notch.
Tensile strength, 9,008 lbs./sq. in.
Rockwell hardness (M scale), 100.
Stiffness in flexure, 473,239 lbs./sq. in.

Example V

A mixture of 28 parts of 4-vinylcyclohexene diepoxide and 35 parts of phthalic anhydride is heated at 130° C. until a soft transparent gel is obtained, 1¾ hours being required. On cooling to room temperature, the gel becomes white and opaque, but is still soft enough to be readily broken into small lumps. To the cold gel is added 0.2 part of a 10% aqueous solution of benzyltrimethylammonium hydroxide as catalyst, and this mixture is milled on a cold rubber mill until it is homogeneous. The milled polymer, which is harder than before milling, is ground to a fine white thermosetting powder. This powder is molded into bars at 165° C. and 1000–5000 lbs./sq. in. pressure. During this molding step the thermosetting polyester becomes a clear, transparent, hard, infusible polymer. When tested by standard procedures, this polymer has the following properties:

Impact strength (Izod), 0.274 ft. lb./in. of notch.
Tensile strength, 1,600 lbs./sq. in.
Rockwell hardness (M scale), 99.

Example VI

A mixture of 3.3 parts of maleic anhydride and 4.2 parts of 4-vinylcyclohexene diepoxide (1.1:1.0 mole ratio) is heated at 80° C. for 5 hours, during which time a yellow solid forms. The temperature is then raised to 150° C. where it is maintained for 2 hours. The resulting polymer is transparent and very hard.

The examples have illustrated the preparation of the hard, transparent polyesters of this invention with particular reference to the use of phthalic and maleic anhydrides. However, other anhydrides of dicarboxylic acids, including cyclic and polymeric anhydrides of aliphatic, cycloaliphatic and aromatic dicarboxylic acids can be used in the practice of this invention. Specific examples of such anhydrides which are operable include succinic, adipic, sebacic, 1,4-cyclohexane dicarboxylic, 1,2-cyclohexane dicarboxylic, naphthalic, 1,2-naphthalenedicarboxylic, tetrachlorophthalic, and terephthalic anhydrides. The preferred class consists of anhydrides of dicarboxylic acids having from four to twelve carbon atoms. Still more preferred because of the high transparency of the polyesters produced from them are the anhydrides of dicarboxylic acids having from four to twelve carbons and the carbons between the carboxyl groups having hydrogen atoms as the sole substituents.

The importance of employing molar proportions of reactants within the limits of 0.95 to 1.25 moles, inclusive, of dicarboxylic acid anhydride to 1.0 mole of the particular diepoxide of this invention, namely, 4-vinylcyclohexene diepoxide, in order to produce the hard, transparent, and infusible resins of this invention is emphasized by the following data:

A polyester resin prepared by heating a mixture of phthalic anhydride and 4-vinylcyclohexene diepoxide in a molar ratio of 1.34:1.0 in the presence of 0.2% of hydroquinone at 115° C. for ½ hour and at 130° C. for another hour is heterogeneous and not transparent, due to incomplete reaction of this proportion of phthalic anhydride. On the other hand, a polyester prepared from phthalic anhydride and 4-vinylcyclohexene diepoxide in a mole ratio of 0.835:1.0 under the same conditions used in Example I, is a clear, transparent, yellow resin but it has a hardness of only 36 on the Rockwell M scale. This latter resin is too soft for use in most applications.

The examples have illustrated the use of certain materials as catalysts as well as the absence of any added catalyst in this reaction. Specific examples of other materials which can be used to catalyze the reaction include water, acids such as acetic, benzoic, adipic, sulfuric and perchloric; phenols such as phenol, hydroquinone, and catechol; and basic compounds such as pyridine, aniline, benzyltrimethylammonium butoxide, and dilute sodium hydroxide.

The thermosetting polyesters produced in the first stage of this invention are of particular value, when isolated and ground into finely divided particles, for use as molding powders. Because of their great transparency and hardness, the high molecular weight polyester resins produced by the complete process of this invention are particularly useful for ornamental purposes, for example, for use in jewelry, buttons, etc.

As many apparently widely different embodiments of this invention may be made without departing from the spirit and scope thereof, it is to be understood that I do not limit myself to the specific embodiments thereof except as defined in the appended claims.

I claim:
1. A process which comprises heating, at a temperature of from about 75° C. to about 250° C. and until polymerization takes place, an anhydride of a dicarboxylic acid and 4-vinylcyclohexene diepoxide in a mole ratio of from 0.95 to 1.25 moles of said anhydride to 1.0 mole of said diepoxide.

2. A process which comprises heating, at a temperature of from about 75° C. to about 135° C. and until a polymeric thermosetting gel is obtained, an anhydride of a dicarboxylic acid and 4-vinylcyclohexene diepoxide in a mole ratio of from 0.95 to 1.25 moles of said anhydride to 1.0 mole of said diepoxide, and then heating the resulting gel at a temperature of from about 140° C. to 250° C. until it is converted into a hard, infusible product.

3. The process set forth in claim 1 in which said anhydride is phthalic anhydride.

4. The process set forth in claim 2 in which said anhydride is phthalic anhydride.

5. A process which comprises heating, in contact with acid catalyst, at a temperature of from about 75° C. to about 250° C. and until polymerization takes place, an anhydride of a dicarboxylic acid and 4-vinylcyclohexene diepoxide in a mole ratio of from 0.95 to 1.25 moles of said anhydride to 1.0 mole of said diepoxide.

6. A process which comprises heating, in contact with basic catalyst, at a temperature of from about 75° C. to about 250° C. and until polymerization takes place, an anhydride of a dicarboxylic acid and 4-vinylcyclohexene diepoxide in a mole ratio of from 0.95 to 1.25 moles of said anhydride to 1.0 mole of said diepoxide.

7. A process which comprises heating, in contact with a phenol as a catalyst, at a temperature of from about 75° C. to about 250° C. and until polymerization takes place, an anhydride of a dicarboxylic acid and 4-vinylcyclohexene diepoxide in a mole ratio of from 0.95 to 1.25 moles of said anhydride to 1.0 mole of said diepoxide.

8. A process which comprises heating, at a temperature of from about 75° C. to about 135° C. and until a polymeric thermosetting gel is obtained, an anhydride of a dicarboylic acid and 4-vinylcyclohexene diepoxide in a mole ratio of from 0.95 to 1.25 moles of said anhydride to 1.0 mole of said diepoxide, and then heating the resulting gel in contact with an acid catalyst at a temperature of from about 140° C. to 250° C. until it is converted into a hard, infusible product.

9. A process which comprises heating, at a temperature of from about 75° C. to about 135° C. and until a polymeric thermosetting gel is obtained, an anhydride of a dicarboxylic acid and 4-vinylcyclohexene diepoxide in a mole ratio of from 0.95 to 1.25 moles of said anhydride to 1.0 mole of said diepoxide, and then heating the resulting gel in contact with a basic catalyst at a temperature of from about 140° C. to 250° C. until it is converted into a hard, infusible product.

10. A process which comprises heating, at a temperature of from about 75° C. to about 135° C. and until a polymeric thermosetting gel is obtained, an anhydride of a dicarboxylic acid and 4-vinylcyclohexene diepoxide in a mole ratio of from 0.95 to 1.25 moles of said anhydride to 1.0 mole of said diepoxide, and then heating the resulting gel in contact with a phenol as a catalyst at a temperature of from about 140° C. to 250° C. until it is converted into a hard, infusible product.

11. The process set forth in claim 9 in which said catalyst is benzyltrimethylammonium hydroxide.

12. The process set forth in claim 1 in which said anhydride is maleic anhydride.

13. A polyester of an anhydride of a dicarboxylic acid and 4-vinylcyclohexene diepoxide in a mole ratio of from 0.95 to 1.25 moles of said anhydride to 1.0 mole of said diepoxide.

14. The polyester set forth in claim 13 in which said anhydride is phthalic anhydride.

15. The polyester set forth in claim 13 in which said anhydride is maleic anhydride.

ROBERT E. FOSTER.

No references cited.

Certificate of Correction

Patent No. 2,527,806 October 31, 1950

ROBERT E. FOSTER

It is hereby certified that error appears in the printed specification of the above numbered patent requiring correction as follows:

Column 4, line 3, for "(.095:1.0" read *(0.95:1.0*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*